Aug. 29, 1939.   A. G. DEAN   2,171,426
VEHICLE ROOF CONSTRUCTION AND METHOD OF ASSEMBLY
Original Filed April 10, 1937   2 Sheets-Sheet 1
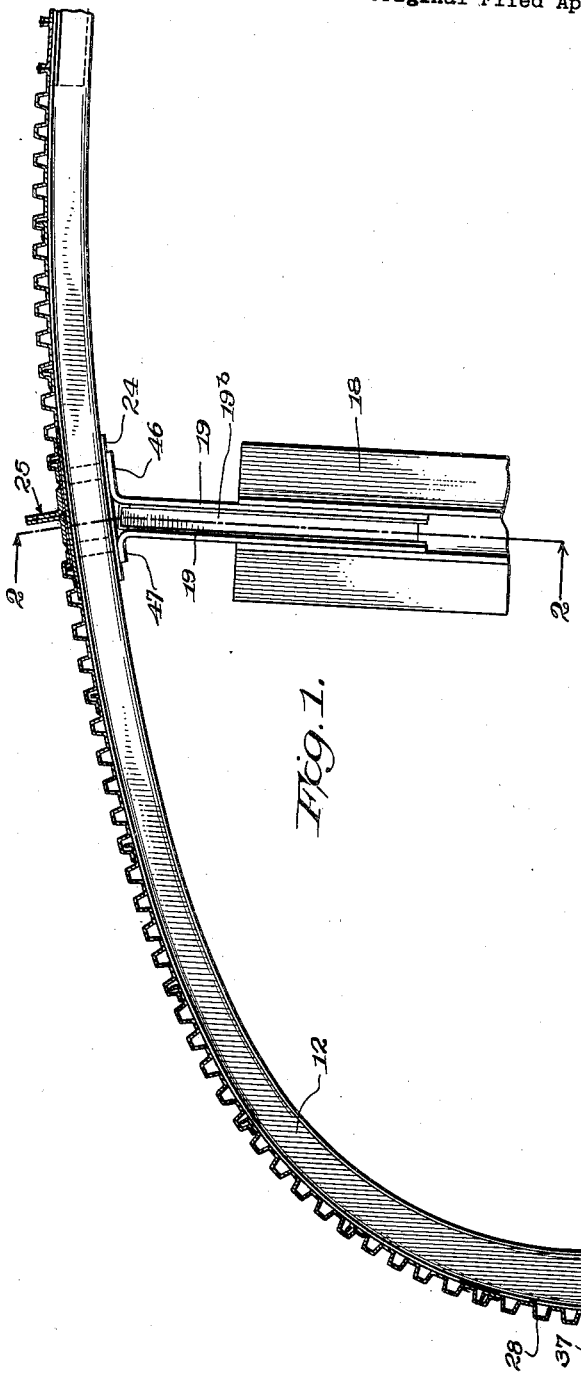
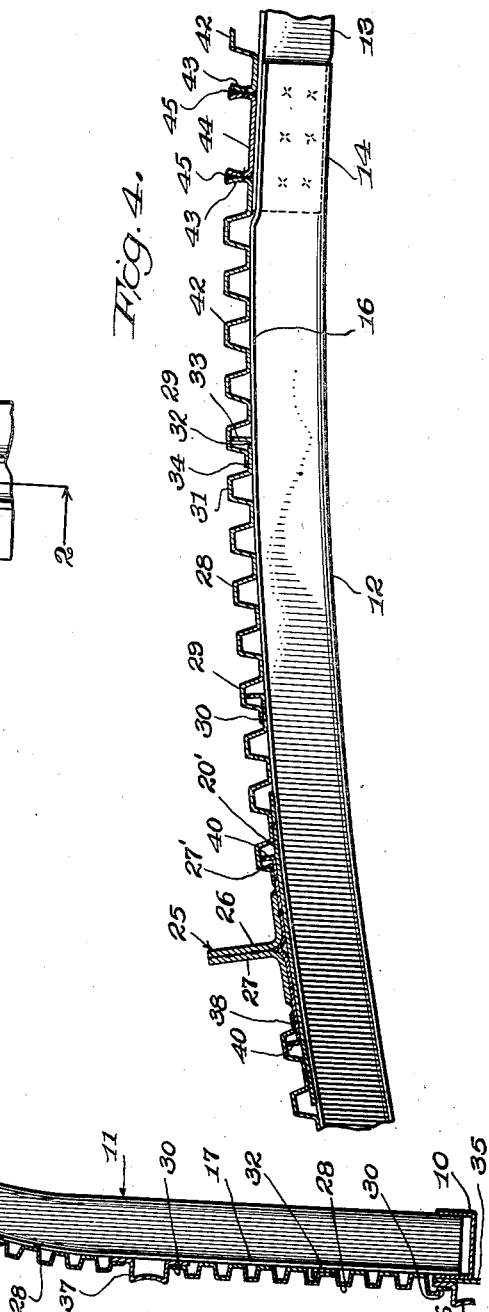
INVENTOR.
Albert G. Dean
BY
John P. Fairbox
ATTORNEY.

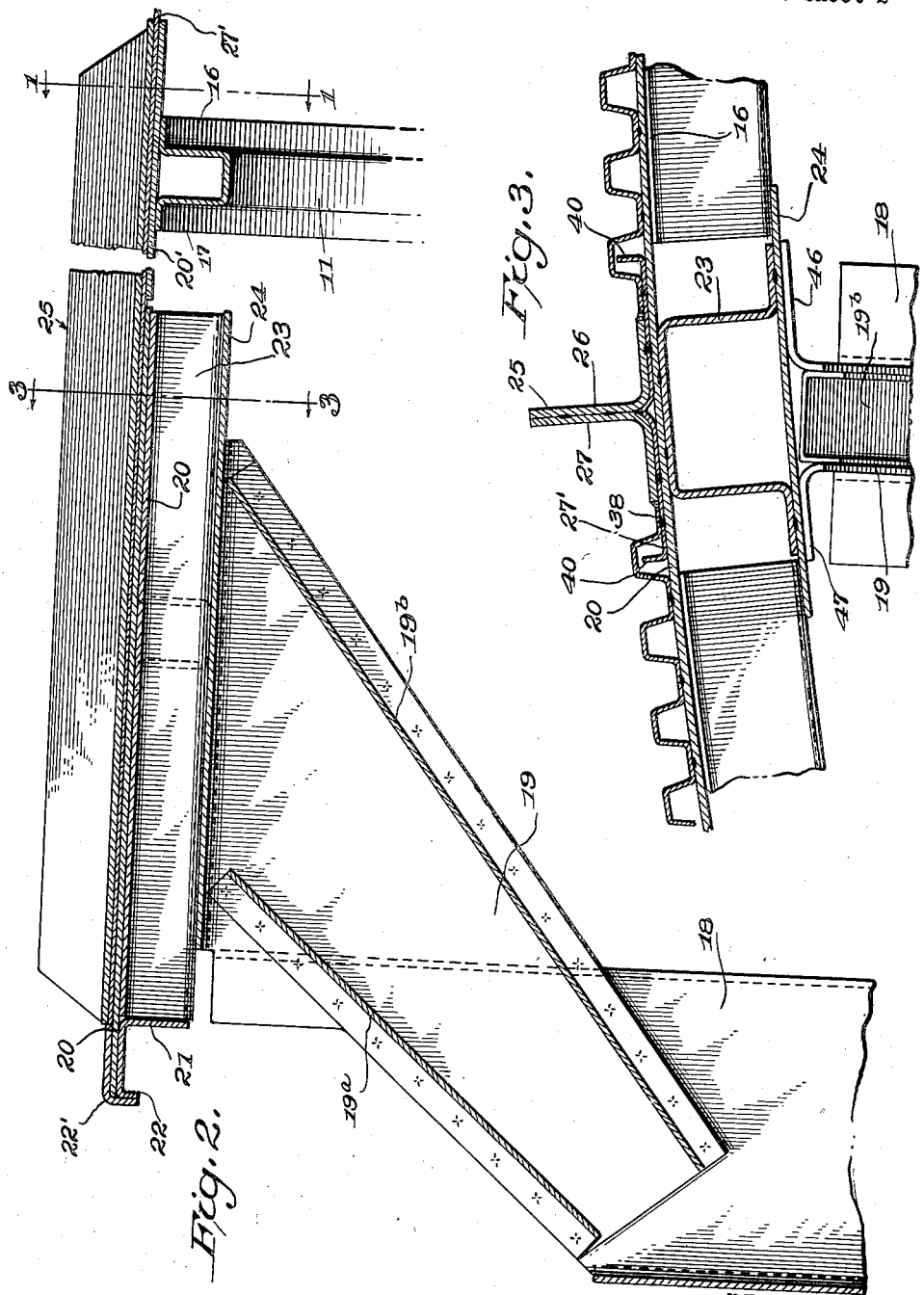

Patented Aug. 29, 1939

2,171,426

UNITED STATES PATENT OFFICE 2,171,426

VEHICLE ROOF CONSTRUCTION AND METHOD OF ASSEMBLY

Albert G. Dean, Narberth, Pa., assignor to Edward G. Budd Manufacturing Company, Philadelphia, Pa., a corporation of Pennsylvania Application April 10, 1937, Serial No. 136,198
Renewed January 31, 1939

16 Claims. (Cl. 108—5.4)

The invention relates to a roof construction and more particularly to a roof construction for vehicle bodies such as rail cars, busses and the like.

It is among the objects of the invention to provide a roof construction which is of light weight yet strong enough to take a substantial compression load, thereby permitting the overall lightening of vehicles, such as rail cars, in which the structure is used. It is a further object of the invention to strongly reinforce the end portion of the roof where it ties into the vertical door posts and to provide such reinforcement without encroaching beyond the usual carlines upon the interior of the car body. A further object of the invention is to fabricate the roof in such manner as to facilitate the formation of the parts entering into the roof structure by quantity production methods and to facilitate the assembly of these parts in the roof subassembly. It is a further object of the invention to assemble the roof sheathing in such manner as to facilitate the production of a weather tight roof construction.

These objects are attained in part by providing purline structures on the outside of the carlines to extend over a plurality of carlines and in approximate vertical alignment with the end door posts thus forming a simplified reinforced roof structure where these posts are tied to the roof. Lightness and ease of fabrication are attained by making the elements entering into the roof preferably of high tensile stainless steel, the carlines being die pressed channel or Z-section members, in some cases, of increasing depth from center to side of the roof and the sheathing comprising longitudinal corrugated strips formed so as to provide tolerances in assembling and to permit their assembly to the carlines successively from the side of the roof to the center. To provide for the ease of assembly and a weather proof joint, these sheathing strips are suitably flanged in their edges, in their outer edges laterally and in their inner edges laterally and outwardly, spot welded in their overlapping margins and finally completely waterproofed by soldering the seams. The assembly of the sheathing can thus proceed from both sides of the roof toward the center and is completed by an outwardly flanged channel member inserted between the flanges of the corrugated sheathing strips next adjacent the center and secured thereto.

Other and further objects of the invention and the advantages following from the construction by which they are obtained will become evident from the following detailed description when read in connection with the drawings forming a part hereof.

In the drawings:

Figure 1 is a partial transverse sectional view adjacent one end of the roof subassembly of the invention, the section being taken looking toward the end of the roof approximately on the line 1—1 of Figure 2.

Figure 2 is a vertical longitudinal section through the end of the roof structure taken substantially along the line 2—2 of Figure 1 looking in the direction of the arrows at the end of the section line, the section of Figure 2 being on an enlarged scale.

Figure 3 is a fragmentary transverse sectional view through the roof structure on a still further enlarged scale, the section being taken substantially on the line 3—3 of Figure 2 looking in the direction of the arrows at the end of the section line.

Figure 4 is an enlarged transverse sectional view of the central portion of the roof according to Figure 1, parts shown in Figure 1 being omitted and the section being extended somewhat further across the center line than in Figure 1.

According to one embodiment of the invention as shown in the drawings, the principal framework of the roof subassembly comprises marginal upwardly facing channels, one of which is indicated at 10 in Figure 1 and the transversely extending arched carlines 11 suitably spaced longitudinally of each other and having their ends telescoped within the channels 10. These parts are assembled together in a suitable jig located on the floor of the shop in which the roof is fabricated.

The carlines are throughout of flanged channel-section as shown in Figure 2, the channel presenting toward the outside of the car body. In the vertical side portions of the roof subassembly and in the region where these vertical sides curve inwardly into the top portion of the roof, the carlines are preferably made of deeper section thereby providing the added strength where such strength is desired. To facilitate the formation of the carlines with this varying cross section, they are preferably die formed into two halves 12 and 13, see Figure 4, these halves forming a lapped joint in the center of the roof at 14 but being offset the thickness of the metal in the region of this lap joint and spot welded together throughout their side and bottom walls and the laterally extended flanges as appears in Figure 4.

The subassembled carlines so described have their ends telescoped within the channels 10 and secured by spot welding the bottom wall of the channel of a carline to one side of the channel 10, and the laterally extending flanges 16 and 17 to the opposite side wall of the channel 10. At the end of the roof it is tied into the heavy vertical end posts 18, usually of longitudinally deep, box-section structure, one of which is indicated to one side of the center of the roof in Figures 1 and 2 where it flanks a doorway opening. This tie is made through inclined generally triangular gusset plates 19, the plates being transversely tied together by channels 19a and 19b spacing them at front and rear and secured thereto by spot welding, thus constituting them, like the posts, box-section structures. As shown in Figures 2 and 3, the channel of the carline next to the end is discontinuous in this region of joinder of the gussets but its spaced ends are joined together by a plate 20 extending in from the end of the roof some distance beyond this carline and extending laterally from side to side of the roof subassembly and overlapping the spaced carline sections on opposite sides of the center line and spot welded to the lateral flanges 16 and 17 of this carline. This plate furnishes substantial reinforcement to the end portion of the roof structure. At the extreme end, a carline 21 of angular section having its upper horizontally extending arm flanged downwardly at 22 is provided and spot welded to the plate 20 and also the overlapping finish angle 22'.

In this region of joinder of the end posts to the roof, the roof is reinforced longitudinally by an inner purline structure of flanged channel section presenting inwardly of the car body as shown at 23 in Figure 3, this purline being reinforced not only by plate 20 already described but also by a plate 24 of substantially the same longitudinal extent as the purline spot welded to its lateral flanges. This inner purline, however, does not cross any of the primary carlines and is of a longitudinal extent sufficient only to provide a reinforced tie in between the end posts and the outer purline structure forming a principal longitudinal reinforcement for the roof structure.

In the subassembly the channel 23 and the plate 24 are preferably spot welded together in subassembly through the flanges of the channel and the subassembly so produced is then brought in place and the bottom wall of the channel 23 spot welded to the plate 20 while the laterally extended portions of the plate 24 are spot welded to the bottoms of the adjacent carline ends. Since the channel 23 is of substantially the same depth as the channels forming the carlines in this region, this construction provides a very substantial longitudinal reinforcement for the roof without encroaching upon the space interiorly of the car body beyond said carlines.

To still further strengthen the roof longitudinally in this region, there is provided an outside purline assembly 25 which may be fabricated from two angular sections 26 and 27 spot welded together through their overlapping arms and having their other arms extending in opposite directions in the same plane. These angular sections 26 and 27 may extend inwardly from the end of the roof a distance sufficient to overlap several carlines, ordinarily in the neighborhood of 6 to 10 feet, but where additional strength is desired in the roof, they may extend throughout a substantial portion of the length thereof or even the entire length. The angles 26 and 27 are secured to a shallow channel shaped plate 27' through their laterally extending flanges to form the outside purline subassembly and this subassembly is secured in final assembly where it crosses the carlines beyond this plate to a separate plate 20' extending laterally a distance beyond the purline subassembly sufficient to overlap several corrugations of the roof sheathing and of an inward longitudinal extent similar to the extent of the angles 26 and 27. The plate 20' is, like the plate 20, spot welded to the lateral flanges of the carlines across which it extends.

From the foregoing description, it will be seen that a strongly reinforced roof structure in substantially the vertical plane of the end posts is produced and one well calculated to distribute the loading from these posts into the roof structure as a whole, particularly since the purline structure already described is strongly connected to the roof sheathing in a manner to be described.

The roof sheathing for convenience in assembly and fabrication and to provide adequate compression strength without unduly adding to the weight of the structure is preferably formed of longitudinal corrugated sheet metal strips acting as combined sheathing and purlines and designated by the numeral 28, these strips, like shallow channel plate 27', running the full length of the roof.

As clearly appears in Figures 1 and 4, these strips comprise generally a number of corrugations, the last corrugation, as 29, adjacent one side being provided with a short outwardly projecting flange 30 and the last corrugation 31 adjacent the other side being formed with a relatively wide flange 32 terminating in an upstanding flange 33 of somewhat less height than the depth of the corrugations. In the assembly of the corrugated strips to the carlines 11 they are spot welded to the lateral flanges at the margins of the carlines.

In the assembly, the outer narrow flange 30 of one strip overlaps the inner wide flange 32 of an adjacent strip with the flange 33 extending upwardly in the first corrugation, as 29, of the first mentioned strip. Since the flanges 32 and 30 differ in width and the corrugations also have some width, lateral adjustment is permitted in the assembly to take care of slight variations in width of the strips. In this relation the flanges 30 and 32 are spot welded together and to the lateral flanges 16 and 17 of the carlines. This arrangement provides for a ready joinder of the parts by spot welding and a fairly tight joint between the parts. However, to insure a waterproof joint, the joint between the panel strips is further sealed with a line of solder 34, thus insuring absolute water tightness. The arrangement of the overlap between the strips allows this soldering to be effected in locations where the solder is most effective and least likely to crack.

With this construction, the following order of assembly of the sheathing and outer longitudinal reinforcing members has proved convenient and expeditious. First, referring now to Figure 1, the final assembly gusset 35 and the moulding strip 36 at the bottom edge of the roof subassembly are spot welded to the outer flange of the channel 10. Also the upper downwardly facing flanged channel moulding strip 37 may at this time be applied and secured by spot welding through its lateral edge flanges and the lateral edge flanges of the carlines. The first two panel strips 28 are then assembled and this may be done by assembling each panel separately or first assembling the panel strips together and then assembling them to the structure as a subassembly.

In the first instance, the lower edge flange 30 is brought into overlapping relation with the upper edge flange of the moulding strip 36 and spot welded thereto while the upper edge flange 32 is spot welded directly to the lateral flanges 16 and 17 of the carlines. The next succeeding strip differs from the typical strip above described by having a narrow flange at both sides, instead of a narrow flange at one side, and a relatively wide flange with an outwardly extending flange at the opposite side. This is by reason of the fact that its upper edge is arranged to overlap the lateral downwardly extending flange of the moulding strip 37 and is secured thereto. Above and inwardly of the moulding strip 37 the panel strips are assembled successively from the outside inwardly to the region where the outwardly projecting purlines and the plates through which they are welded to the carlines are arranged.

The strip just outside of the purline assembly is similar to the second strip from the edge of the roof structure in that it is merely flanged laterally at its inner edge, and overlaps the margins of the plate 20' through several corrugations and is strongly welded thereto through said corrugations. The strip inside of the purline assembly is joined thereto in the same manner as the outside strip. This lateral flange 38 overlaps the edge of the channel plate 27' forming part of the purline subassembly and is spot welded thereto and the underlying plate 20'.

The lateral margins of the plate 27' are preferably outwardly flanged at 40, these flanges extending under and into the adjacent corrugations of the sheathing strips in the same manner as the flange of one sheathing strip extends into the adjacent corrugation of the next adjacent strip, as already described. From the purline subassembly inwardly the strips are assembled in the usual manner already described until the strips 42 adjacent the center line of the roof are reached. These strips 42 adjacent the center line at opposite sides thereof are each provided with a terminal outwardly extending flange 43 and the roof sheathing is finally completed by inserting the outwardly facing channel 44 between the flanges of the corrugated paneling strips 42 and spot welding it thereto.

The manner in which the sheathing is secured to the parts 20', 40 and 25 of the purline structure and to the carlines, as by numerous spot welds, insures the distribution of the compression load from the purlines into the roof structure as a whole.

As already pointed out, after the parts are so spot welded together the roof sheathing is fairly tight in its joints but in order to insure absolute water tightness, each of the joints between the longitudinally extending strips forming the sheathing is sealed with a line of solder 34. It will be noted from Figure 4 that the outer margins of the overlapping flanges of the strips 42 and the channel 44 are spaced from each other forming a V-shaped pocket between them which pocket is also sealed with solder indicated by numeral 45.

As clearly shown in Figure 3, the gusset plates 19 extending upwardly from the post 18 are laterally flanged at 46 and 47 and secured through said lateral flanges to the reinforced roof structure in this region by spot welding them to the longitudinally extending plate 24 and the overlapping lateral flanges of the channel 23.

The foregoing construction lends itself particularly to fabrication out of thin gauge, high tensile stainless steel, such as "18 and 8"; the joints between the parts are all open and accessible to permit of their expeditious assembly both in subassembly and in final assembly; and the parts are of such configuration as to facilitate their formation by die rolling or drawing. In fact, the entire construction is such as to greatly facilitate the manufacture of structures of this class in large quantities by the usual quantity production methods. By reason of this construction, the roof structure is a very rigid unit which can be easily handled in the shop and brought down in final assembly and secured to the tops of the side and end walls of the vehicle, and is well calculated when so assembled to take a substantial portion of the loading to which the bodies of this class are subjected.

While I have herein shown and described a specific embodiment of my invention, it will be understood that changes and modifications may be made without departing from the spirit and scope of the appended claims.

What I claim is:

1. A roof structure for vehicle bodies having vertical door posts anchored into an end of the roof structure, said roof structure having transverse carlines at longitudinal spaced intervals and longitudinally corrugated sheathing secured to the carlines, said structure being reinforced at the end and for a distance extending inwardly from the end of said roof structure over several carlines by a purline structure attached both to the outer faces of said carlines and to the sheathing, the reinforcement distributing the compression loads due to the anchorage of the vertical door posts of the end wall in this region into the roof structure as a whole.

2. A roof structure for vehicle bodies having transverse carlines of hollow cross section at longitudinal spaced intervals, the first carline in from an end of the roof structure being discontinuous in the region of attachment of the roof structure to a vertical post of an end wall of the body, but reinforced in this region by a hollow section inner purline of substantially the depth of the carline, the carline and purline being interconnected at top and bottom by flat plates overlapping the adjacent parts of said purline and carline.

3. A roof structure having transverse carlines of hollow cross section spaced longitudinally, the carline next to the end of the roof being crossed by an inner purline in the region of joinder of a vertical end post to the roof, and an outer purline further reinforcing the roof in said region but extended inwardly to overlap and be secured to at least one additional carline.

4. A vehicle roof having carlines and sheathing made from sheet metal and a sheet metal purline, comprising a member having a plate base overlapping and secured to the carlines and an outwardly extending intermediate stiffening ridge between the side edges of said base, the base plate being extended laterally to overlap adjacent margins of the roof sheathing and secured thereto.

5. A vehicle roof having longitudinally spaced carlines and longitudinally corrugated sheathing secured to said carlines, and a purline comprising an angular section member extending inwardly from the end of the roof to overlap a plurality of carlines on their outer sides and secured thereto and to the corrugated roof sheathing.

6. A roof structure for vehicle bodies having transverse carlines of hollow cross section at longitudinally spaced intervals, the first carline in from the end being discontinuous in the region of the attachment of the roof structure to a vertical post of an end wall of the body, but reinforced in this region by inner and outer longitudinal purlines, the outer purline extending over several carlines and secured thereto, the inner purline being of less longitudinal extent but sufficient to form an extended anchorage for the end wall post.

7. A roof structure having carlines and embodying a purline sub-assembly adapted to be applied in final assembly to the outer faces of the carlines, said purline sub-assembly including a substantially flat sheet metal strip and a pair of angles secured together through their overlapping arms, the other arms of the angles extending laterally to overlap and be secured to the flat strip and through it to the carlines.

8. A roof structure embodying longitudinally spaced transverse carlines, a purline structure adapted to be applied to the outside faces of the carlines, said purline structure including a multiple plate structure fitting against the outer faces of the carlines, and a vertical stiffening flange projecting outwardly from said plate structure intermediate its lateral edges.

9. A roof structure embodying longitudinally spaced carlines, the carline next to an end of said structure being transversely discontinuous to permit the passage of a flanged channel section purline, but rendered continuous by top and bottom plates interconnecting the purline and the ends of the carline at opposite sides of said purline, the flanges of said channel and said bottom plate forming a double thickness anchorage area of substantial extent to which a front wall post is adapted to be strongly anchored.

10. A roof structure for vehicle bodies embodying in an end portion thereof, transverse longitudinal spaced carlines, and in the region of the anchorage of an end wall post to the roof structure a bottom plate fitted against the inside of certain of said carlines and extended inwardly from an end of the body a substantial distance, a flanged channel section purline secured to said plate through its flanges and of substantially the depth of the carlines, a transverse plate secured to the outer faces of said carlines and said purline, and an outer purline structure overlying and secured to said channel purline and extended inwardly beyond the same for securement to additional carlines.

11. A carline for vehicle roofs made of sheet metal, said carline comprised of two stampings each extending from the center line of the roof to its respective side and of increasing depth toward its lateral extremity, the central portions overlapping and secured together.

12. In a transversely arched roof structure, a weather proof joint between longitudinal through running corrugated roof sheets, the outer and lower of said sheets having its inner edge flanged laterally parallel to the plane of the sheet and then outwardly, the adjacent inner and higher sheet having a narrower edge flange paralleling the plane of the sheet, said narrow flange overlapping the lateral flange of the first sheet with the outwardly extending flange thereof projecting into the first corrugation of the second sheet, said overlapping flanges being spot welded together, and a filling of solder applied along the joint between said sheets.

13. The method of assembling a transversely arched roof structure including carlines and longitudinally extending through running corrugated strips of sheathing each having a narrow lateral flange at the bottom of the outermost corrugation and a wide lateral flange terminating at the edge in an upwardly extending flange at the bottom of the innermost corrugation, which consists in assembling said corrugated strips from the opposed lower outer sides upwardly and inwardly toward the center with the outer corrugation on one strip overlapping the outwardly extending flanges of the next adjacent strip and the narrow edge flange overlapping the wide flange, and securing them together by spot welding through said flanges and in finally closing the roof at the center by a longitudinal channel strip having its sides overlapping the outwardly extending flanges of the adjacent corrugated strips and spot welding the parts together through said overlap.

14. A roof structure embodying spaced transverse carlines longitudinally extending strips of longitudinally corrugated roof sheathing secured to said carlines, a longitudinal shallow channel member extending the length of the sheathing strips and secured in the space between two corrugated sheathing strips and secured thereto and to the carlines, said channel providing a means through which a longitudinally extending outer purline of a desired length may be secured to the carlines and sheathing.

15. A roof structure for vehicle bodies embodying spaced transverse carlines, a longitudinal plate extending inwardly from one end of the roof structure over a plurality of said carlines and secured thereto, sheathing strips embodying longitudinal corrugations overlapping the lateral edges of said plate and secured thereto through a plurality of corrugations, and an outer purline assembly secured to said plate and the carlines and the margins of the adjacent longitudinal sheathing strips.

16. In a transversely arched roof structure, a joint between longitudinal through running corrugated roof sheets, the outer and lower of said sheets having its inner edge flanged laterally parallel to the plane of the sheet and then outwardly to a depth less than the depth of a corrugation, the adjacent inner and higher sheet having a narrower edge flange paralleling the plane of the sheet, said narrow flange overlapping the lateral flange of the first sheet with the outwardly extending flange thereof projecting into the first corrugation of the second sheet, said overlapping flanges being spot welded together and weather-proofing material applied along the joints between said sheets.

ALBERT G. DEAN.